United States Patent [19]
Brant et al.

[11] Patent Number: 5,274,799
[45] Date of Patent: Dec. 28, 1993

[54] STORAGE DEVICE ARRAY ARCHITECTURE WITH COPYBACK CACHE

[75] Inventors: William A. Brant; David C. Stallmo, both of Boulder, Colo.; Mark Walker, Los Gatos; Albert Lui, San Jose, both of Calif.

[73] Assignee: Array Technology Corporation, Boulder, Colo.

[21] Appl. No.: 638,167

[22] Filed: Jan. 4, 1991

[51] Int. Cl.⁵ .............................................. G06F 11/10
[52] U.S. Cl. .................................. 395/575; 395/425; 371/10.1
[58] Field of Search ............... 371/40.1, 40.2, 51.1, 371/10.1, 13; 364/200 MS File, 900 MS File; 395/425, 575

[56] References Cited

U.S. PATENT DOCUMENTS

| | | | |
|---|---|---|---|
| 3,893,178 | 7/1975 | Sordello | 360/73 |
| 4,092,732 | 5/1978 | Ouchi | 364/900 |
| 4,467,421 | 8/1984 | White | 364/200 |
| 4,562,576 | 12/1985 | Ratcliffe | 371/21.1 |
| 4,593,354 | 6/1986 | Ushiro | 364/200 |
| 4,604,750 | 8/1986 | Manton | 371/40.2 |
| 4,667,326 | 5/1987 | Young et al. | 371/40.1 |
| 4,722,085 | 1/1988 | Flora et al. | 371/38 |
| 4,733,396 | 3/1988 | Baldwin | 371/40.2 |
| 4,754,397 | 6/1988 | Varaiya et al. | 364/200 |
| 4,761,785 | 8/1988 | Clark | 371/2.2 |
| 4,768,193 | 8/1988 | Takemae | 371/10.1 |
| 4,775,978 | 10/1988 | Hartness | 371/38 |
| 4,791,642 | 12/1988 | Taylor | 371/40.2 |
| 4,817,035 | 3/1989 | Timsit | 364/900 |
| 4,849,929 | 3/1989 | Timsit | 364/900 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,920,539 | 4/1990 | Albonesi | 371/40.2 |
| 4,958,351 | 9/1990 | Flora | 371/21.1 X |
| 4,993,030 | 2/1991 | Krakauer et al. | 371/40.1 |
| 4,995,041 | 2/1991 | Hetherington | 371/40.1 |
| 5,058,116 | 10/1991 | Chao | 371/40.1 |

OTHER PUBLICATIONS

Patterson, D. A., Gibson, G., and Katz, H.; A Case For Redundant Arrays of Inexpensive Disks (RAID).
(List continued on next page.)

Primary Examiner—Robert W. Beausoliel, Jr.
Assistant Examiner—Ly V. Hua
Attorney, Agent, or Firm—Spensley Horn Jubas & Lubitz

[57] ABSTRACT

A fault-tolerant storage device array using a copyback cache storage unit for temporary storage. When a Write occurs to the RAID system, the data is immediately written to the first available location in the copyback cache storage unit. Upon completion of the Write to the copyback cache storage unit, the host CPU is immediately informed that the Write was successful. Thereafter, further storage unit accesses by the CPU can continue without waiting for an error-correction block update for the data just written. In a first embodiment of the invention, during idle time for relevant storage units of the storage system, an error-correction block is computed for each "pending" data block on the copyback cache storage unit, and the data block and corresponding error-correction block are copied to their proper location in the RAID system. The copyback cache storage unit in effect stores "peak load" Write data and then completes the actual Write operations to the RAID system during relatively quiescent periods of I/O accesses by the CPU. In a second embodiment of the invention, after Write data is logged to the copyback cache storage unit, normal Read-Modify-Write operation by the RAID system controller continues in overlapped fashion with other CPU I/O accesses using Write data in the controller's buffer memory. Performance is enhanced because the CPU can continue processing as soon as the simple Write operation to the copyback cache storage unit completes, thus eliminating the delay caused by a normal Read-Modify-Wrote RAID system. In this embodiment, the copyback cache storage unit acts more as a running "log" of Write data.

22 Claims, 3 Drawing Sheets

OTHER PUBLICATIONS

Lee, E. K.; Software and Performance Issues in the Implementation of a RAID Prototype (May 1990).

Chen, P., Gibson, G., Katz, R. H., Patterson, D. A., and Schulze, M.; Introduction to Redundant Arrays of Inexpensive Disks (RAID (Dec. 1988).

Chen, P., Gibson, G., Katz, R. H., Patterson, D. A., and Schulze, M., et al. Evolution of the Raid 2 Architecture (Jun. 12, 1990).

Maximum Strategy, Inc., San Jose, Calif.; Strategy 2 Disk Array Controller Operation Manual (Nov. 2, 1988).

Maximum Strategy, Inc., San Jose, Calif.; Strategy 1 Disk Array Controller Operation Manual (Date unknown).

Gibson, G. A., Performance and Reliability in Redundant Arrays of Inexpensive Disks (Date Unknown).

Chen, P., An Evaluation of Redundant Arrays of Disks Using an Amdahl 5890; (May 1989).

Katz, R. H., Gibson, G. A., and Patterson, D. A.,; Disk System Architectures for High Performance Computing (Mar. 1989).

Gray, J., Horst, B., and Walker, M.; Parity Striping of Disc Arrays: Low-Cost Reliable Storage with Acceptable Throughtput (Jan. 1990).

Schultz, M. E.; Considerations in the Design of a Raid Prototype (Aug. 1988).

Clark, and Corrigan; IBM Systems Journal, vol. 23, No. 3, 1989.

John Ousterhout, Beating the I/O Bottleneck: A Case for Log-Structured File Systems; Aug. 4, 1988.

STORAGE DEVICE ARRAY ARCHITECTURE WITH COPYBACK CACHE

BACKGROUND OF THE INVENTION

1. Field of the Invention

This invention relates to computer system data storage, and more particularly to a fault-tolerant storage device array using a copyback cache storage unit for temporary storage.

2. Description of Related Art

A typical data processing system generally involves one or more storage units which are connected to a Central Processor Unit (CPU) either directly or through a control unit and a channel. The function of the storage units is to store data and programs which the CPU uses in performing particular data processing tasks.

Various type of storage units are used in current data processing systems. A typical system may include one or more large capacity tape units and/or disk drives (magnetic, optical, or semiconductor) connected to the system through respective control units for storing data.

However, a problem exists if one of the large capacity storage units fails such that information contained in that unit is no longer available to the system. Generally, such a failure will shut down the entire computer system.

The prior art has suggested several ways of solving the problem of providing reliable data storage. In systems where records are relatively small, it is possible to use error correcting codes which generate ECC syndrome bits that are appended to each data record within a storage unit. With such codes, it is possible to correct a small amount of data that may be read erroneously. However, such codes are generally not suitable for correcting or recreating long records which are in error, and provide no remedy at all if a complete storage unit fails. Therefore, a need exists for providing data reliability external to individual storage units.

Other approaches to such "external" reliability have been described in the art. A research group at the University of California, Berkeley, in a paper entitled "A Case for Redundant Arrays of Inexpensive Disks (RAID)", Patterson, et al., *Proc. ACM SIGMOD*, June 1988, has catalogued a number of different approaches for providing such reliability when using disk drives as storage units. Arrays of disk drives are characterized in one of five architectures, under the acronym "RAID" (for Redundant Arrays of Inexpensive Disks).

A RAID 1 architecture involves providing a duplicate set of "mirror" storage units and keeping a duplicate copy of all data on each pair of storage units. While such a solution solves the reliability problem, it doubles the cost of storage. A number of implementations of RAID 1 architectures have been made, in particular by Tandem Corporation.

A RAID 2 architecture stores each bit of each word of data, plus Error Detection and Correction (EDC) bits for each word, on separate disk drives (this is also known as "bit striping"). For example, U.S. Pat. No. 4,722,085 to Flora et al. discloses a disk drive memory using a plurality of relatively small, independently operating disk subsystems to function as a large, high capacity disk drive having an unusually high fault tolerance and a very high data transfer bandwidth. A data organizer adds 7 EDC bits (determined using the well-known Hamming code) to each 32-bit data word to provide error detection and error correction capability. The resultant 39-bit word is written, one bit per disk drive, on to 39 disk drives. If one of the 39 disk drives fails, the remaining 38 bits of each stored 39-bit word can be used to reconstruct each 32-bit data word on a word-by-word basis as each data word is read from the disk drives, thereby obtaining fault tolerance.

An obvious drawback of such a system is the large number of disk drives required for a minimum system (since most large computers use a 32-bit word), and the relatively high ratio of drives required to store the EDC bits (7 drives out of 39). A further limitation of a RAID 2 disk drive memory system is that the individual disk actuators are operated in unison to write each data block, the bits of which are distributed over all of the disk drives. This arrangement has a high data transfer bandwidth, since each individual disk transfers part of a block of data, the net effect being that the entire block is available to the computer system much faster than if a single drive were accessing the block. This is advantageous for large data blocks. However, this arrangement also effectively provides only a single read/write head actuator for the entire storage unit. This adversely affects the random access performance of the drive array when data files are small, since only one data file at a time can be accessed by the "single" actuator. Thus, RAID 2 systems are generally not considered to be suitable for computer systems designed for On-Line Transaction Processing (OLTP), such as in banking, financial, and reservation systems, where a large number of random accesses to many small data files comprises the bulk of data storage and transfer operations.

A RAID 3 architecture is based on the concept that each disk drive storage unit has internal means for detecting a fault or data error. Therefore, it is not necessary to store extra information to detect the location of an error; a simpler form of parity-based error correction can thus be used. In this approach, the contents of all storage units subject to failure are "Exclusive OR'd" (XOR'd) to generate parity information. The resulting parity information is stored in a single redundant storage unit. If a storage unit fails, the data on that unit can be reconstructed on to a replacement storage unit by XOR'ing the data from the remaining storage units with the parity information. Such an arrangement has the advantage over the mirrored disk RAID 1 architecture in that only one additional storage unit is required for "N" storage units. A further aspect of the RAID 3 architecture is that the disk drives are operated in a coupled manner, similar to a RAID 2 system, and a single disk drive is designated as the parity unit.

One implementation of a RAID 3 architecture is the Micropolis Corporation Parallel Drive Array, Model 1804 SCSI, that uses four parallel, synchronized disk drives and one redundant parity drive. The failure of one of the four data disk drives can be remedied by the use of the parity bits stored on the parity disk drive. Another example of a RAID 3 system is described in U.S. Pat. No. 4,092,732 to Ouchi.

A RAID 3 disk drive memory system has a much lower ratio of redundancy units to data units than a RAID 2 system. However, a RAID 3 system has the same performance limitation as a RAID 2 system, in that the individual disk actuators are coupled, operating in unison. This adversely affects the random access performance of the drive array when data files are small, since only one data file at a time can be accessed by the "single" actuator. Thus, RAID 3 systems are generally not considered to be suitable for computer systems designed for OLTP purposes.

A RAID 4 architecture uses the same parity error correction concept of the RAID 3 architecture, but improves on the performance of a RAID 3 system with respect to random reading of small files by "uncoupling" the operation of the individual disk drive actuators, and reading and writing a larger minimum amount of data (typically, a disk sector) to each disk (this is also known as block striping). A further aspect of the RAID 4 architecture is that a single storage unit is designated as the parity unit.

A limitation of a RAID 4 system is that Writing a data block on any of the independently operating data storage units also requires writing a new parity block on the parity unit. The parity information stored on the parity unit must be read and XOR'd with the old data (to "remove" the information content of the old data), and the resulting sum must then be XOR'd with the new data (to provide new parity information). Both the data and the parity records then must be rewritten to the disk drives. This process is commonly referred to as a "Read-Modify-Write" sequence.

Thus, a Read and a Write on the single parity unit occurs each time a record is changed on any of the data storage units covered by the parity record on the parity unit. The parity unit becomes a bottle-neck to dat writing operations since the number of changes to records which can be made per unit of time is a function of the access rate of the parity unit, as opposed to the faster access rate provided by parallel operation of the multiple data storage units. Because of this limitation, a RAID 4 system is generally not considered to be suitable for computer systems designed for OLTP purposes. Indeed, it appears that a RAID 4 system has not been implemented for any commercial purpose.

A RAID 5 architecture uses the same parity error correction concept of the RAID 4 architecture and independent actuators, but improves on the writing performance of a RAID 4 system by distributing the data and parity information across all of the available disk drives. Typically, "N+1" storage units in a set (also known as a "redundancy group") are divided into a plurality of equally sized address areas referred to as blocks. Each storage unit generally contains the same number of blocks. Blocks from each storage unit in a redundancy group having the same unit address ranges are referred to as "stripes". Each stripe has N blocks of data, plus one parity block on one storage unit containing parity for the remainder of the stripe. Further stripes each have a parity block, the parity blocks being distributed on different storage units. Parity updating activity associated with every modification of data in a redundancy group is therefore distributed over the different storage units. No single unit is burdened with all of the parity update activity.

For example, in a RAID 5 system comprising 5 disk drives, the parity information for the first stripe of blocks may be written to the fifth drive; the parity information for the second stripe of blocks may be written to the fourth drive; the parity information for the third stripe of blocks may be written to the third drive; etc. The parity block for succeeding stripes typically "precesses" around the disk drives in a helical pattern (although other patterns may be used).

Thus, no single disk drive is used for storing the parity information, and the bottleneck of the RAID 4 architecture is eliminated. An example of a RAID 5 system is described in U.S. Pat. No. 4,761,785 to Clark et al.

As in a RAID 4 system, a limitation of a RAID 5 system is that a change in a data block requires a Read-Modify-Write sequence comprising two Read and Two Write operations: the old parity block and old data block must be read and XOR'd, and the resulting sum must then be XOR'd with the new data. Both the data and the parity blocks then must be rewritten to the disk drives. While the two Read operations may be done in parallel, as can the two Write operations, modification of a block of data in a RAID 4 or a RAID 5 system still takes substantially longer then the same operation on a conventional disk. A conventional disk does not require the preliminary Read operation, and thus does have to wait for the disk drives to rotate back to the previous position in order to perform the Write operation. The rotational latency time alone can amount to about 50% of the time required for a typical data modification operation. Further, two disk storage units are involved for the duration of each data modification operation, limiting the throughput of the system as a whole.

Despite the Write performance penalty, RAID 5 type systems have become increasingly popular, since they provide high data reliability with a low overhead cost for redundancy, good Read performance, and fair Write performance. However, it would be desirable to have the benefits of a RAID 5 system without the Write performance penalty resulting from the rotational latency time imposed by the parity update operation.

The present invention provides such a system.

SUMMARY OF THE INVENTION

The present invention solves the error-correction block bottleneck inherent in a RAID 5 architecture by recognition that storage unit accesses are intermittent. That is, at various times one or more of the storage units in a RAID 5 system are idle in terms of access requests by the CPU. This characteristic can be exploited by providing a "copyback cache" storage unit as an adjunct to a standard RAID system. The present invention provides two alternative methods of operating such a system.

In both embodiments, when a Write occurs to the RAID system, the data is immediately written to the first available location in the copyback cache storage unit. Upon completion of the Write to the copyback cache storage unit, the host CPU is immediately informed that the Write was successful. Thereafter, further storage unit accesses by the CPU can continue without waiting for an error-correction block update for the data just written.

In the first embodiment of the invention, during idle time for relevant storage units of the storage system, an error-correction block (e.g., XOR parity) is computed for each "pending" data block on the copyback cache storage unit, and the data block and corresponding error-correction block are copied to their proper location in the RAID system. Optionally, if a number of pending data blocks are to be written to the same stripe, an error-correction block can be calculated from all data blocks in the stripe at one time, thus achieving some economy of time. In this embodiment, the copyback cache storage unit in effect stores "peak load" Write data and then completes the actual Write operations to the RAID system during relatively quiescent periods of I/O accesses by the CPU.

In the second embodiment of the invention, after Write data is logged to the copyback cache storage unit, normal Read-Modify-Write operation by the RAID system controller continues in overlapped fashion with other CPU I/O accesses, using Write data in the controller's buffer memory. Performance is enhanced because the CPU can continue processing as soon as the simple Write operation to the copyback cache storage unit completes, thus eliminating the delay caused by a normal Read-Modify-Write RAID system. In this embodiment, the copyback cache storage unit acts more as a running "log" of Write data. Data integrity is preserved since the Write data is saved to the copyback cache storage unit and thus accessible even if the Read-Modify-Write operation to the RAID system never completes.

The copyback cache storage unit is preferably nonvolatile, so that data will not be lost on a power failure. If the copyback cache storage unit is a disk drive, it preferably is paired with a "mirror" storage unit for fault tolerance. Optionally, the copyback cache storage unit may be a solid-state storage unit, which can achieve substantially faster Write and error-correction block update times than a disk drive.

The details of the preferred embodiments of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the drawings refer to like elements.

DETAILED DESCRIPTION OF THE INVENTION

Throughout this description, the preferred embodiments and examples shown should be considered as exemplars, rather than limitations on the present invention.

Figure 1:
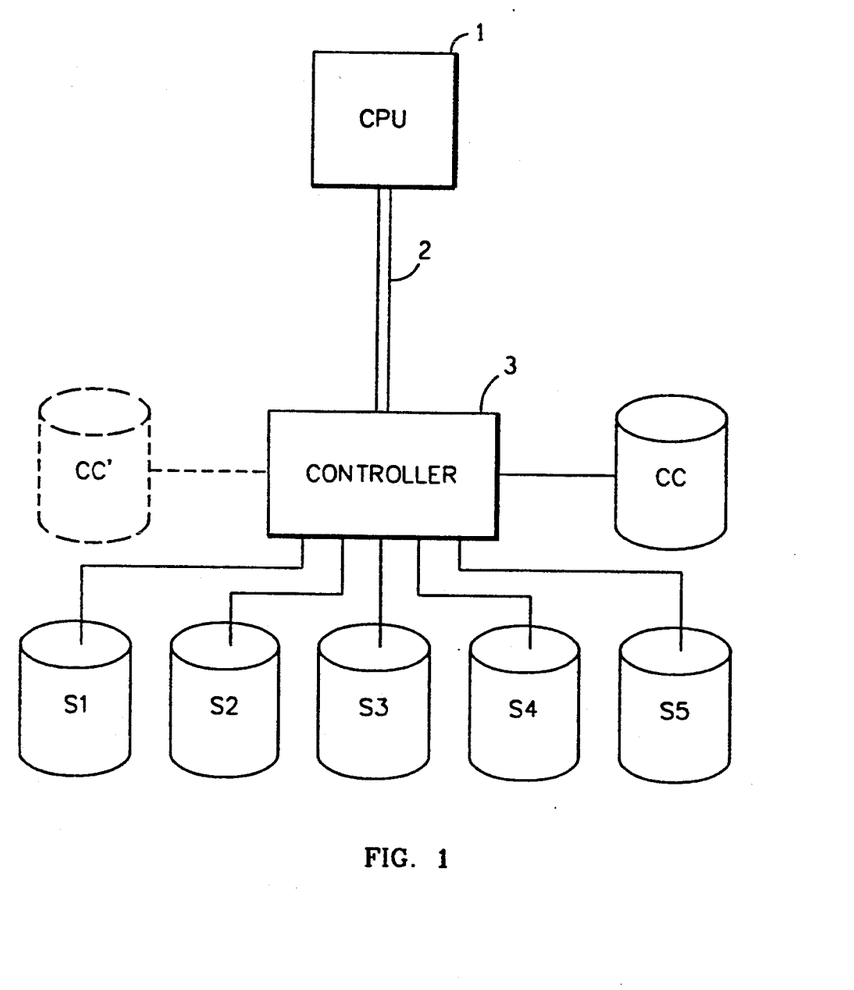
FIG. 1 is block diagram of a copyback cache RAID system in accordance with the present invention.

FIG. 1 is block diagram of a copyback cache RAID system in accordance with the present invention. Shown are a CPU 1 coupled by a bus 2 to an array controller 3, which in the preferred embodiment is a fault-tolerant controller. The array controller 3 is coupled to each of the plurality of storage units S1-S5 (five being shown by way of example only) by an I/O bus (e.g., a SCSI bus). The storage units S1-S5 are failure independent, meaning that the failure of one unit does not affect the physical operation of other units. The array controller 3 is preferably includes a separately programmable processor (for example, the MIPS R3000 RISC processor, made by MIPS of Sunnyvale, Calif.) which can act independently of the CPU 1 to control the storage units.

Also attached to the controller 3 is a copyback cache storage unit CC, which in the preferred embodiment is coupled to the common I/O bus (e.g., a SCSI bus) so that data can be transferred between the copyback cache storage unit CC and the storage units S1-S5. The copyback cache storage unit CC is preferably nonvolatile, so that data will not be lost on a power failure. If the copyback cache storage unit CC is a disk drive, it preferably is paired with a "mirror" storage unit CC' for fault tolerance. The mirror storage unit CC' is coupled to the controller 3 such that all data written to the copyback cache storage unit CC is also written essentially simultaneously to the mirror storage unit CC', in known fashion. Optionally, the copyback cache storage unit CC may be a solid-state storage unit, which can achieve substantially faster Write and error-correction block update times than a disk drive. In such a case, the solid-state storage unit preferably includes error-detection and correction circuitry, and is either non-volatile or has a battery backup on the power supply.

The storage units S1-S5 can be grouped into one or more redundancy groups. In the illustrated examples described below, the redundancy group comprises all of the storage units S1-S5, for simplicity of explanation.

Figure 2:
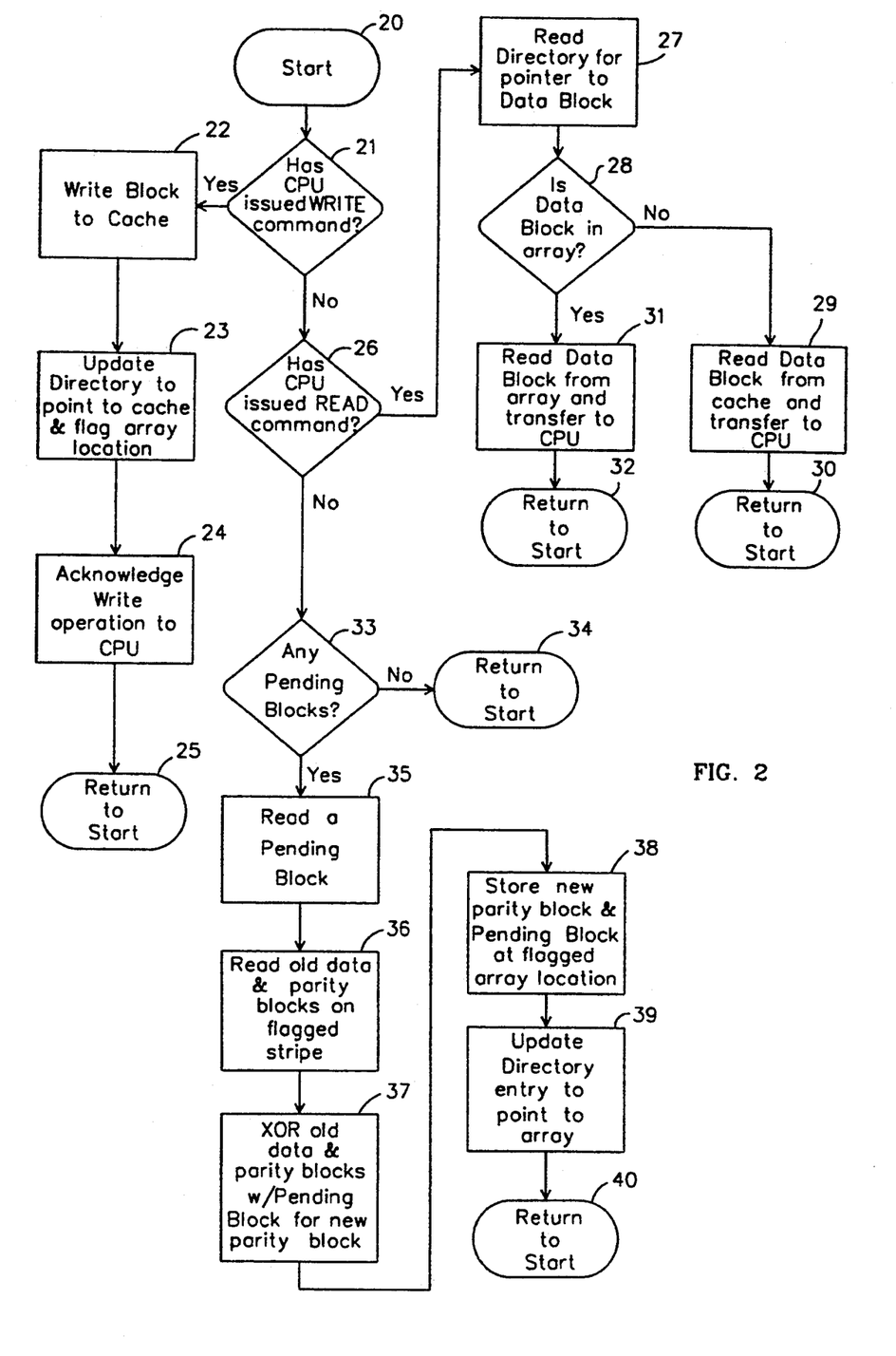
FIG. 2 is a flow-chart of Read and Write operation in accordance with a first embodiment of the present invention.
Figure 3:
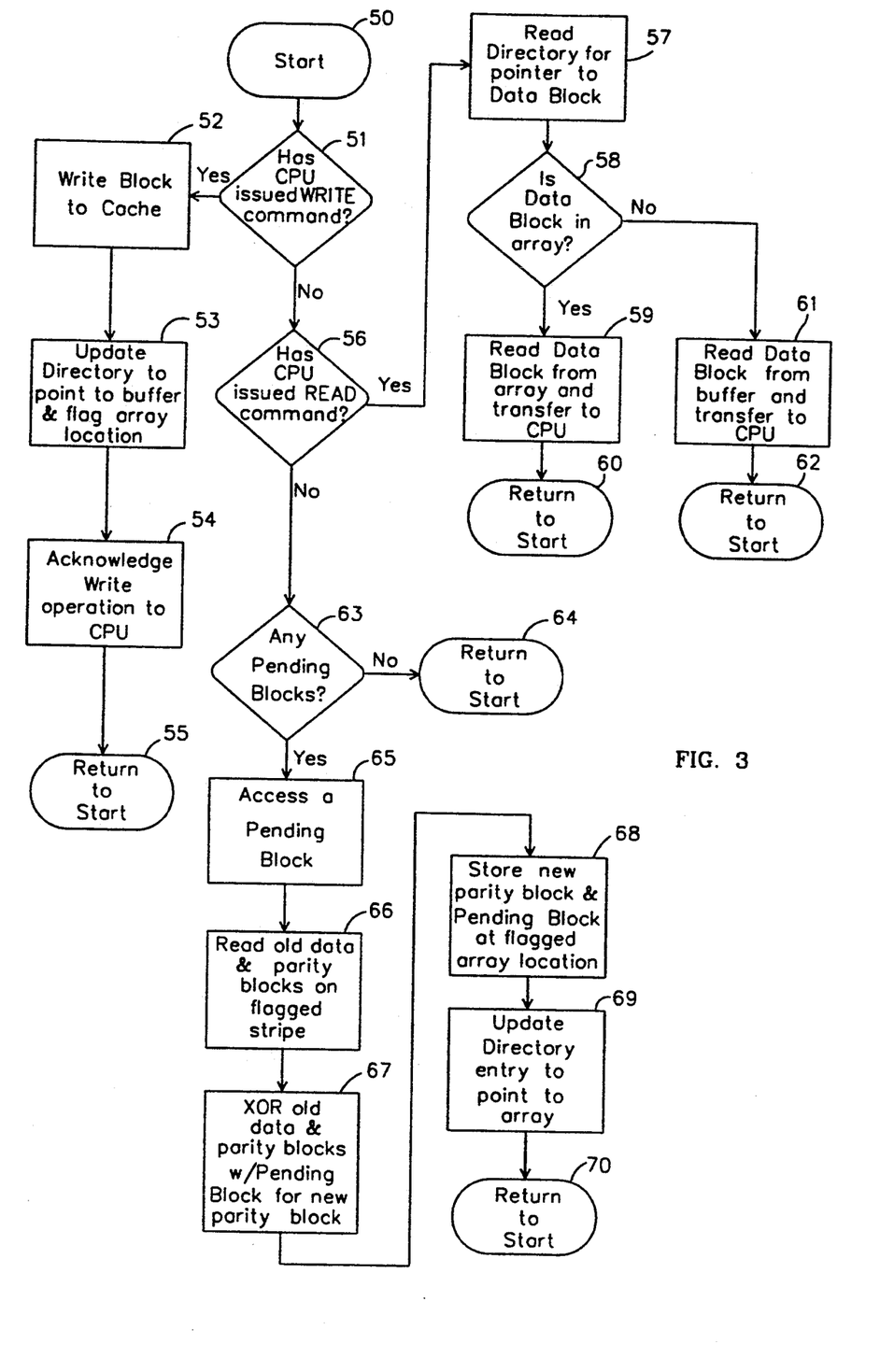
FIG. 3 is a flow-chart of Read and Write operation in accordance with a second embodiment of the present invention.

The present invention is preferably implemented as a computer program executed by the controller 3. FIG. 2 is a high-level flowchart representing the steps of the Read and Write processes for a first embodiment of the invention. FIG. 3 is a high-level flowchart representing the steps of the Read and Write processes for a second embodiment of the invention. The steps shown in FIGS. 2 and 3 are referenced below.

The Peak Load Embodiment

The controller 3 monitors input/output requests from the CPU 1 on essentially a continuous basis (Step 20). If a Write request is pending (Step 21), the data block is immediately written to the first available location in the copyback cache storage unit CC (Step 22) (the data block is also stored on the mirror storage unit CC', if present). Preferably, writing begins at the first logical block on the copyback cache storage unit CC, and continues sequentially to the end of the logical blocks. Thereafter, writing commences again at the first block (so long as no blocks are overwritten that have not been stored in the array). This preferred method minimizes time-consuming SEEK operations (i.e., physical movements of a Read/Write head in a storage unit) in the copyback cache storage unit CC.

Each data block stored on the copyback cache storage unit CC is also flagged with the location in the array where the data block is ultimately to be stored, and a pointer is set to indicate that the data block is in the copyback cache storage unit CC (Step 23). This location and pointer information is preferably kept in a separate table in memory or on the copyback cache storage unit CC. The table preferably comprises a directory table having entries that include standard information regarding the size, attributes, and status of each data block. In addition, each entry has one or more fields indicating whether the data block is stored on the copyback cache storage unit CC or in the array (S1-S5), and the "normal" location in the array for the data blocks. Creation of such directory tables is well-known in the art.

If a data block is written to the copyback cache storage unit CC while a data block to be stored at the same location in the array is still a "pending block" (a data block that has been Written to the copyback cache storage unit CC but not transferred to the array S1-S5), the directory location pointer for the data block is changed to point to the "new" version rather than to the "old" version. The old version is thereafter ignored, and may be written over in subsequent operations.

After a Write request is processed in this fashion, the controller 3 immediately sends an acknowledgement to the CPU 1 indicating that the Write operation was successful (Step 24). The monitoring process then repeats (Step 25). Further storage unit accesses by the CPU 1 can continue without waiting for an error-correction block update for the data block just written. Thus, the Write "throughput" time of the array appears to be the same as a non-redundant system, since storage of the Write data on the copyback cache storage unit CC does not require the Read-Modify-Write sequence of a standard RAID system with respect to operation of the CPU 1.

If a Write request is not pending (Step 21), the controller 3 tests whether a Read request is pending (Step 26). If a Read request is pending, the controller 3 reads the directory table to determine the location of each requested data block (Step 27). If a requested data block is not in the array (Step 28), the controller 3 reads the block from the copyback cache storage unit CC and transfers it to the CPU 1 (Step 29). The monitoring process then repeats (Step 30). If the requested data block is in the array (Step 28), the controller 3 reads the block from the array (S1-S5) in normal fashion and transfers it to the CPU 1 (Step 31). The monitoring process then repeats (Step 32).

Some embodiments of the invention may include disk cache memory in the controller 3. Read requests may of course be "transparently" satisfied from such a cache in known fashion.

If no Write or Read operation is pending for particular storage units in the array, indicating that those storage units are "idle" with respect to CPU 1 I/O accesses, the controller 3 checks to see if any data blocks are "pending blocks" flagged to locations on the idle storage units. If no pending blocks exist (Step 33), the controller 3 begins the monitoring cycle again (Step 34).

If a pending block does exist (Step 33), the controller 3 reads a pending block from the copyback cache storage unit CC (Step 35). The controller 3 then writes the pending block to the proper location in the array, and computes and stores a new error-correction block that is computed based upon the pending block.

In the preferred embodiment of the invention, the error-correction blocks contain parity information. Thus, update of the error-correction block for the pending block can be accomplished by reading the old data block and old error-correction block corresponding to the array location indicated by the location information for the pending block stored in the directory (Step 36). The controller 3 then XOR's the old data block, the pending data block, and the old error-correction block to generate a new error-correction block (Step 37). The new error-correction block and the pending block are then written to the array S1-S5 at their proper locations (Step 38).

Optionally, if a number of pending blocks are to be written to the same stripe, error-correction can be calculated for all data blocks in the stripe at one time by reading all data blocks in the stripe that are not being updated, XOR'ing those data blocks with the pending blocks to generate a new error-correction block, and writing the pending blocks and the new error-correction block to the array. This may achieve some economy of time.

After the pending block is transferred from the copyback cache storage unit CC to the array, the directory entry for that block is modified to indicate that the data block is in the array rather than in the copyback cache storage unit CC (Step 39). Thereafter, the controller 3 begins the monitoring cycle again (Step 40).

Although the invention has been described in terms of a sequential branching process, the invention may also be implemented in a multi-tasking system as separate tasks executing concurrently. Thus, the Read and Write processes described above, as well as the transfer of pending data blocks, may be implemented as separate tasks executed concurrently. Accordingly, the tests indicated by Steps 21, 26, and 33 in FIG. 2 may be implicitly performed in the calling of the associated tasks for Writing and Reading data blocks, and transfer of pending blocks. Thus, for example, the transfer of a pending block from the copyback cache storage unit CC to a storage unit in the array may be performed concurrently with a Read operation to a different storage unit in the array. Further, if the array is of the type that permits the controller 3 to "stack" a number of I/O requests for each storage unit of the array (as is the case with many SCSI-based RAID systems), the operations described above may be performed "concurrently" with respect to accesses to the same storage unit.

The Data Log Embodiment

As in the embodiment describe above, the controller 3 monitors input/output requests from the CPU 1 on essentially a continuous basis (Step 50). In this embodiment, the controller 3 is provided with a relatively large (for example, one megabyte) data buffer to temporarily store data to be written to the array. If a Write request is pending (Step 51), the data block is immediately written by the controller 3 to the first available location in the copyback cache storage unit CC (Step 52) (the data block is also stored on the mirror storage unit CC', if present). Preferably, writing begins at the first logical block on the copyback cache storage unit CC, and continues sequentially to the end of the logical blocks. Thereafter, writing commences again at the first block (so long as no blocks are overwritten that have not been stored in the array). This preferred method minimizes SEEK operations in the copyback cache storage unit CC.

In the first embodiment, SEEK operations are required to retrieve pending blocks during idle times to transfer to the array. In this embodiment, the copyback cache storage unit CC acts as a running "log" of Write data. In contrast with the first embodiment, SEEK operations normally are necessary only to change to a next data-writing area (e.g., a next cylinder in a disk drive) when the current area is full, or to reset the Read/Write head back to the logical beginning of the storage unit after reaching the end, or to retrieve data blocks after a failure.

Each data block stored on the copyback cache storage unit CC is also flagged with the location in the array where the data block is ultimately to be stored and the location of the data block in the copyback cache storage unit CC, and a pointer is set to indicate that the data block is in the controller buffer (Step 53). As before, such location and pointer information is preferably kept in a directory table.

Because of the buffer in the controller 3, the definition of a "pending block" in the second embodiment differs somewhat from the definition in the first embodiment described above. A "pending block" is a data block that has been Written to the copyback cache storage unit CC but not transferred from the controller buffer to the array S1-S5.

If a data block is written to the copyback cache storage unit CC while a data block to be stored at the same location in the array is still a "pending block" in the controller buffer, the directory location pointers for the data block are changed to point to the "new" version rather than to the "old" version both in the copyback cache storage unit CC and in the buffer. The old version is thereafter ignored, and may be written over in subsequent operations.

After a Write request is processed in this fashion, the controller 3 immediately sends an acknowledgement to the CPU 1 indicating that the Write operation was successful (Step 54). The monitoring process then repeats (Step 55). Further storage unit accesses by the CPU 1 can continue without waiting for an error-correction block update for the data block just written. Thus, the Write response time of the array appears to be the same as a non-redundant system, since storage of the Write data on the copyback cache storage unit CC does not require the Read-Modify-Write sequence of a standard RAID system with respect to operation of the CPU 1.

If a Write request is not pending (Step 51), the controller 3 tests whether a Read request is pending (Step 56). If a Read request is pending, the controller 3 reads the directory table to determine the location of each requested data block (Step 57). If a requested data block is in the array (Step 58), the controller 3 reads the block from the array (S1-S5) in normal fashion and transfers it to the CPU 1 (Step 59). The monitoring process then repeats (Step 60).

If a requested data block is not in the array (Step 58), it is in the buffer of the controller 3. The controller 3 transfers the data block from its buffer to the CPU 1 (Step 61). This operation is extremely fast compared to the first embodiment, since the buffer operates at electronic speeds with no mechanically-imposed latency period. The monitoring process then repeats (Step 62).

If no Write or Read operation is pending for particular storage units in the array, indicating that those storage units are "idle" with respect to CPU 1 I/O accesses, the controller 3 checks to see if any data blocks in its buffer are "pending blocks" flagged to locations on the idle storage units. If no pending blocks exist (Step 63), the controller 3 begins the monitoring cycle again (Step 64).

If a pending block does exist (Step 63), the controller 3 accesses the pending block (Step 65), and then computes and stores a new error-correction block based upon the pending block. As before, in the preferred embodiment of the invention, the error-correction blocks contain parity information. Thus, update of the error-correction block for the pending block can be accomplished by reading the old data block and old error-correction block corresponding to the array location indicated by the location information for the pending block stored in the directory (Step 66). The controller 3 then XOR's the old data block, the pending data block, and the old error-correction block to generate a new error-correction block (Step 67). The new error-correction block and the pending block are then written to the array S1-S5 (Step 68).

Optionally, if a number of pending blocks are to be written to the same stripe, error-correction can be calculated for all data blocks in the stripe at one time by reading all data blocks in the stripe that are not being updated, XOR'ing those data blocks with the pending blocks to generate a new error-correction block, and writing the pending blocks and the new error-correction block to the array. This may achieve some economy of time.

After the pending block is transferred from the buffer of the controller 3 to the array, the directory is modified to indicate that the pending block is no longer valid in the copyback cache storage unit CC or in the buffer (Step 69). The old pending block is thereafter ignored, and may be written over in subsequent operations. The controller 3 then restarts the monitoring cycle (Step 70).

If a failure to the system occurs before all pending blocks are written from the buffer to the array, the controller 3 can read the pending blocks from the copyback cache storage unit CC that were not written to the array. The controller 3 then writes the selected pending blocks to the array.

Again, although the invention has been described in terms of a sequential branching process, the invention may also be implemented in a multi-tasking system as separate tasks executing concurrently. Accordingly, the tests indicated by Steps 51, 56, and 63 in FIG. 3 may be implicitly performed in the calling of the associated tasks for Writing and Reading data blocks, and transfer of pending blocks.

The present invention therefore provides the benefits of a RAID system without the Write performance penalty resulting from the rotational latency time imposed by the standard error-correction update operation, so long as a non-loaded condition exists with respect to I/O accesses by the CPU 1. Idle time for any of the array storage units is productively used to allow data stored on the copyback cache storage unit CC to be written to the array (either from the cache itself, or from the controller buffer) during moments of relative inactivity by the CPU 1, thus improving overall performance.

A number of embodiments of the present invention have been described. Nevertheless, it will be understood that various modifications may be made without departing from the spirit and scope of the invention. For example, the present invention can be used with RAID 3, RAID 4, or RAID 5 systems. Furthermore, an error-correction method in addition to or in lieu of XOR-generated parity may be used for the necessary redundancy information. One such method using Reed-Solomon codes is disclosed in U.S. patent application Ser. No. 270,713, filed Nov. 14, 1988, entitled "Arrayed Disk Drive System and Method" and commonly assigned.

As another example, in many RAID systems, a "hot spare" storage unit is provided to immediately substitute for any active storage unit that fails. The present invention may be implemented by using such a "hot spare" as the copyback cache storage unit CC, thus eliminating the need for a storage unit dedicated to the copyback cache function. If the "hot spare" is needed for its primary purpose, the RAID system can fall back to a non-copyback caching mode of operation until a replacement disk is provided.

As yet another example, the copyback cache storage unit CC may be attached to the controller 3 through a dedicated bus, rather than through the preferred common I/O bus (e.g., a SCSI bus).

Accordingly, it is to be understood that the invention is not to be limited by the specific illustrated embodiment, but only by the scope of the appended claims.

We claim:

1. A fault-tolerant storage device array including:
   a. a plurality of failure independent storage units for storing information as stripes of blocks, including at least data blocks and associated error-correction blocks;
   b. at least one copyback cache storage unit for temporarily storing data blocks;
   c. a storage unit controller, coupled to the plurality of storage units and to the at least one copyback cache storage unit, including control means for:
      (1) writing received data blocks initially onto the at least one copyback cache storage unit as pending data blocks;
      (2) during idle time of at least some of the plurality of storage units:
         (a) reading at least one pending data block from at least one copyback cache storage unit;
         (b) accessing the storage units and reading information corresponding to each read pending data block;
         (c) generating an associated error-correction block from the read information and each read pending data block;
         (d) writing each such read pending data block and associated error-correction block to a corresponding stripe of the idle storage units;
      (3) reading requested data blocks from at least one copyback cache storage unit when such requested data blocks have not been written to the plurality of storage units, otherwise from the plurality of storage units.

2. The storage device array of claim 1, wherein the control means acknowledges completion of writing each received data block to the at least one copyback cache storage unit before writing such data block to one of the storage units.

3. The storage device array of claim 1, wherein the information corresponding to each read pending data block includes a corresponding old error-correction block and corresponding old data block read from the corresponding stripe of idle storage units.

4. The storage device array of claim 2, wherein generating a new error-correction block further includes:
   a. reading a corresponding old data block from the corresponding stripe of the idle storage units;
   b. reading a corresponding old error-correction block from the corresponding stripe of the idle storage units;
   c. exclusively-OR'ing the old data block, the old error correction block, and the read pending data block, thereby generating a new error-correction block.

5. The fault-tolerant storage device array of claim 1, wherein at least one copyback cache storage unit is non-volatile.

6. A method for storing data in a fault-tolerant storage device array comprising a plurality of failure independent storage units for storing information as stripes of blocks, including at least data blocks and associated error-correction blocks, including the steps of:
   a. providing at least one copyback cache storage unit for temporarily writing received data blocks;
   b. writing received data blocks initially onto the at least one copyback cache storage unit as pending data blocks;
   c. during idle time of at least one of the plurality of storage units:
      (1) reading at least one pending data block from at least one copyback cache storage unit;
      (2) accessing the storage units and reading information corresponding to each read pending data block;
      (3) generating an associated error-correction block from the read information and each such read pending data block;
      (4) writing each such read pending data block and associated error-correction block to a corresponding stripe of the idle storage units;
   d. reading requested data blocks from at least one copyback cache storage unit when such requested data blocks have not been written to the plurality of storage units, otherwise from the plurality of storage units.

7. The method of claim 6, further including the step of acknowledging completion of writing each received data block to the at least one copyback cache storage unit before writing such data block to one of the storage units.

8. The method of claim 6, wherein the step of generating an associated error-correction block from the read information and each read pending data block comprises the steps of:
   a. generating a new error-correction block as a function of at least the read pending data block, and a corresponding old error-correction block and corresponding old data block read from the corresponding stripe of the idle storage units.

9. The method of claim 8, wherein the step of generating a new error-correction block comprises the steps of:
   a. reading a corresponding old data block from the corresponding stripe of the idle storage units;
   b. reading a corresponding old error-correction block from the corresponding stripe of the idle storage units;
   c. exclusively-OR'ing the old data block, the old error-correction block, and the read pending data block, thereby generating a new error-correction block.

10. The method of claim 6, wherein at least one copyback cache storage unit is non-volatile.

11. A fault-tolerant storage device array including:
   a. a plurality of failure independent storage units for storing information as stripes of blocks, including at least data blocks and associated error-correction blocks;
   b. at least one copyback cache storage unit for temporarily storing data blocks;
   c. a storage unit controller, coupled to the plurality of storage units and to the at least one copyback cache storage unit, having a buffer memory and including control means for:
      (1) writing received data blocks initially onto the at least one copyback cache storage unit;
      (2) temporarily storing received data blocks in the buffer memory as pending data blocks;
      (3) during idle time of at least some of the plurality of storage units:
         (a) accessing at least one pending data block from the buffer memory;

(b) accessing the storage units and reading information corresponding to each accessed pending data block;

(c) generating an associated error-correction block from the read information and each accessed pending data block;

(d) writing each such accessed pending data block and associated error-correction block to a corresponding stripe of the idle storage units;

(4) reading requested data blocks from the buffer memory when such requested data block have not been written to the plurality of storage units, otherwise from the plurality of storage units.

12. The storage device array of claim 11, wherein the control means substantially immediately acknowledges the completion of writing a received record to the at least one copyback cache storage unit.

13. The storage device array of claim 11, wherein the read information includes a corresponding old error-correction block and corresponding old data block read from the corresponding stripe of the idle storage units.

14. The storage device array of claim 13, wherein generating a new error-correction block further includes:
  a. reading a corresponding old data block from the corresponding stripe of the idle storage units;
  b. reading a corresponding old error-correction block from the corresponding stripe of the idle storage units;
  c. exclusively-OR'ing the old data block, the old error-correction block, and the accessed pending data block, thereby generating a new error-correction block.

15. The storage device array of claim 11, further including means for reading selected data blocks from the at least one copyback cache storage unit and writing such selected data blocks to the plurality of storage units upon a failure of the storage unit controller to write all corresponding data blocks from the buffer memory to the plurality of storage units.

16. The fault-tolerant storage device array of claim 11, wherein at least one copyback cache storage unit is non-volatile.

17. A method for storing data in a fault-tolerant storage device array comprising a plurality of failure independent storage units for storing information as stripes of blocks, including at least data blocks and associated error-correction blocks, including the steps of:
  a. providing buffer memory and at least one copyback cache storage unit for temporarily storing data blocks;
  b. writing received data blocks initially onto the at least one copyback cache storage unit;
  c. temporarily storing received data blocks in the buffer memory as pending data blocks;
  d. during idle time of at least one of the plurality of storage units:
    (1) accessing at least one pending data block from the buffer memory;
    (2) accessing the storage units and reading the information corresponding to each accessed pending data blocks;
    (3) generating an associated error-correction block from the read information and each such accessed pending data block;
    (4) writing each such accessed pending data block and associated error-correction block to a corresponding stripe of the idle storage units;
  e. reading requested data blocks from the buffer memory when such requested data blocks have not been written to the plurality of storage units, otherwise from the plurality of storage units.

18. The method of claim 17, further including the step of acknowledging completion of writing each received data block to the at least one copyback cache storage unit before writing such data block to one of the storage units.

19. The method of claim 17, wherein the step of generating an associated error-correction block for each accessed pending data block comprises the steps of:
  a. generating a new error-correction block as a function of at least the accessed pending data block, and a corresponding old error-correction block and corresponding old data block read from the corresponding stripe of the idle storage units.

20. The method of claim 19, wherein the step of generating a new error-correction block comprises the steps of:
  a. reading a corresponding old data block from the corresponding stripe of the idle storage units;
  b. reading a corresponding old error-correction block from the corresponding stripe of the idle storage units;
  c. exclusively-OR'ing the old data block, the old error-correction block, and the accessed pending data block, thereby generating a new error-correction block.

21. The method of claim 17, further including the steps of reading selected data blocks from the at least one copyback cache storage unit and writing such selected data blocks to the plurality of storage units upon a failure of the storage unit controller to write all corresponding data blocks from the buffer memory to the plurality of storage units.

22. The method of claim 17, wherein at least one copyback cache storage unit is non-volatile.

* * * * *